United States Patent
Thomson

[19]

[11] Patent Number: 5,906,523
[45] Date of Patent: May 25, 1999

[54] INTERMEDIATE MARINE BEARING WITH ITEGRATED ALIGNMENT SYSTEM

[75] Inventor: George Allan Thomson, Burlington, Canada

[73] Assignee: Thordon Bearings Inc., Burlington, Canada

[21] Appl. No.: 08/909,072

[22] Filed: Aug. 14, 1997

[51] Int. Cl.⁶ .................................................. B63H 23/34
[52] U.S. Cl. ...................... 440/83; 29/898.09; 254/93 R; 384/428
[58] Field of Search ...................... 440/83, 111; 384/428, 384/537, 584, 620; 29/898.09; 254/93 R

[56] References Cited

U.S. PATENT DOCUMENTS

| | | | |
|---|---|---|---|
| 3,718,378 | 2/1973 | Clay | 440/83 |
| 4,014,515 | 3/1977 | Graafsma | 254/93 R |
| 4,173,329 | 11/1979 | Stith, Jr. | 254/93 R |
| 4,571,096 | 2/1986 | Swasey et al. | |
| 4,749,282 | 6/1988 | Spargo et al. | |
| 4,867,889 | 9/1989 | Jacobson | 252/12.6 |
| 5,641,824 | 6/1997 | Forschirm | |

FOREIGN PATENT DOCUMENTS

| | | | |
|---|---|---|---|
| 26 26 750 A1 | 12/1977 | Germany | |
| 90 07 262 | 10/1990 | Germany | |
| 1024366 | 6/1983 | U.S.S.R. | 440/83 |
| 1030259 | 7/1983 | U.S.S.R. | 440/83 |
| 1 393 908 | 5/1975 | United Kingdom | |
| WO 94/29170 | 12/1994 | WIPO | |

OTHER PUBLICATIONS

"Support for life", Marine Engineers Review, Feb. 1997, p. 32/33, XP000680895, see the whole document.

*Primary Examiner*—Sherman Basinger

[57] ABSTRACT

An intermediate bearing assembly that is mountable on a pedestal of a marine vessel that incorporates an integrated alignment system. In particular, the bearing assembly includes a housing for receiving a portion of a shaft; and a lifting and lowering system attached between the housing and the pedestal for providing a concentrated applied force at approximately the center vertical axis of the housing. The lifting and lowering system includes four hydraulic jacks located equidistant from the center vertical axis of the housing. Hydraulic pressure is related through the area of the jack cylinders to radial force. As a result, when a predetermined jacking force is achieved, the correct radial force loading on the bearing is attained. Each of the jacks is free to seek a position of extension independent of the others. The jacks are then locked into a secure hold position to maintain the shaft in alignment. If at any time during the vessels duty the shaft becomes misaligned the jacks are unlocked and hydraulic pressure is either reduced or increased to level the shaft and the jacks are then locked into the new holding position. This operation can be repeated as many times as required during the vessel's life without the cost of expensive traditional chocking procedures.

22 Claims, 4 Drawing Sheets

5,906,523

INTERMEDIATE MARINE BEARING WITH ITEGRATED ALIGNMENT SYSTEM

FIELD OF THE INVENTION

This invention relates to the field of marine bearings, and more particularly to intermediate bearings having alignment systems used to support the weight and maintain the alignment of intermediate shafting in a marine vessel.

BACKGROUND OF THE INVENTION

Main propulsion shafting in marine vessels is supported by bearings that maintain the shafting in proper alignment. Bearings located inside the ship's water tight boundary are called line shaft or intermediate bearings. Typically, these bearings are of a steel construction (i.e. steel castings or fabricated of steel plates welded together), conservatively designed, babbitt lined and oil lubricated. Reliability is heavily emphasized in the design of the bearings because there is no redundancy for bearings and a single bearing failure can incapacitate the entire propulsion system.

Traditional intermediate bearings are constructed from a white metal bearing surface centrifugally cast to a steel or iron substrate. They are typically split along the horizontal centre line and are lubricated with oil contained in a sump integral with the base casting. The lubricant is raised from the sump by various means to such a position that the oil can lubricate and cool the bearing. To assist in cooling, the sump volume is often fitted with a cooling coil through which cold water is circulated. In some bearing designs forced lubrication is provided to insure that the bearing will never be starved for oil.

Conventional intermediate bearings are lubricated by a hydrodynamic film of oil and early establishment of this film is essential to avoid boundary operating conditions. For example, very slow speed running with a turning gear, for example, is a very risky operating mode for oil/white metal bearings. Seals are often provided at the ends of the bearings to contain the oil within the bearing housing.

These seals are prone to failure allowing bearing oil to drain into the bilge producing the potential for pollution if no oily bilge separator is fitted to the vessel. More importantly, a bearing with an undetected leak can lose its supply of oil and fail with catastrophic results. In an attempt to avoid this type of problem prior art bearings have been fitted with a sight glass to view the oil level or with thermocouples to measure and transmit bearing temperature to a control room for monitoring.

Intermediate bearings must be properly aligned and raised to such a position that they carry the proper loading. This operation is commonly accomplished by hydraulic jacking of the shaft to the required level and then machining and fitting cast iron chocking pieces between the pedestal and the bearing base. Simplified, bearing chocking procedures have been proposed in the prior art that use a castable epoxy resin poured into the chocking spaces and allowed to harden. Damming is used to contain the chocking compound while the resin is in the liquid state.

In particular, in the prior art hydraulic jack method, a calibrated hydraulic jack is used to determine the actual load supported by a bearing and this actual load is then compared with the desired load. The actual bearing load is determined by placing a hydraulic jack as close to the bearing housing as possible. A dial indicator is located immediately above the jack so as to measure vertical movement of the shaft. The shaft is then raised and lowered in increments, noting the jack load corresponding to each increment of shaft rise.

The hydraulic jack method generates load and influence number errors due to inaccuracies that are inherent in the jacking procedure. In particular, since the jack is not located at the bearing center, the load center in adjacent bearings shift as the shaft is raised, causing hysteresis errors.

Provided traditional bearings are maintained in perfect alignment, they can provide general trouble-free operation. However, the flexible nature of a ship's hull allows settling, twisting and bending such that bearing alignment can change. Additions to the ship's structure, modifications to the moment of inertia of the hull, and different loading conditions can influence the alignment of the shaft supported by bearings. This requires that the bearings be repeatedly re-jacked to ensure shaft alignment. This is a very time consuming and costly process.

The alignment of the intermediate shaft is very important because a metal bearing tends to be very sensitive to edge loading produced as a result of pedestal shifting. Even minor alignment deviations are sufficient to cause an increase in bearing temperature at the edge that can lead to wiping. In the most serious form a wiped bearing can cause shaft seizure, resulting in considerable repair time. These events can occur at inopportune occasions, as severe weather is often responsible for inducing bearing problems.

To deal with the shaft alignment problem, complex pedestal bearings have been produced with the bearing elements mounted in a spherical envelope to permit alignment being taken from the shaft line rather than the pedestal. In particular, the bearing shell is made with a self-aligning feature by providing a spherical or crowned seat at the interface between the bearing shell and the housing. This allows the axis of the bearing shell to align with that of the shaft. The main problem with the spherical type bearing is that any correction in alignment gives rise to displacement of the shaft axis at the ends of the housing where the seals are located. Unless the compensation is very slight the seals are unable to accommodate this eccentricity and will leak. These designs are also costly to produce due to the elaborate additional machining steps involved.

Consequently, there is a need for an intermediate bearing that incorporates an alignment system to enable simple and inexpensive alignment and realignment of the shaft at any time. In addition, there is a need for an intermediate bearing that is essentially selflubricating and capable of operation in oil, water or biodegradable lubricants.

SUMMARY OF THE INVENTION

An object of the present invention is to provide a bearing assembly that incorporates an alignment system to enable simple, accurate and inexpensive alignment and realignment of the bearing assembly at any time.

Another object of the present invention is to provide a bearing assembly that is essentially self-lubricating and capable of operation in oil, water or bio-degradable lubricants.

Another object of the present invention is to provide a series of jacks for use on a bearing assembly to incorporate an alignment system to enable simple, accurate and inexpensive alignment and realignment of the bearing assembly at any time.

In accordance with one aspect of the present invention, there is provided a bearing assembly having a center vertical axis and being mountable on a pedestal of a marine vessel, said bearing assembly comprising: a housing for receiving a portion of a shaft; and lifting and lowering means attached between the housing and the pedestal for providing a concentrated applied force at approximately the center vertical axis of the bearing assembly.

In accordance with another aspect of the present invention there is provided a jack for use on a bearing assembly having a housing for receiving a portion of a shaft and being mountable on a pedestal, said jack comprising: a cylinder portion attached to the housing of the bearing assembly; a piston portion slidably engagable within the cylinder portion, said piston portion being attached to the pedestal; control means for raising and lowering the cylinder portion to position the shaft at a desired level; and means for rigidly securing the cylinder portion and piston portion together to maintain the shaft at the desired level.

BRIEF DESCRIPTION OF THE DRAWINGS

Embodiments of the invention will be described by way of example with the drawings in which.

DETAILED DESCRIPTION OF EMBODIMENTS OF THE INVENTION

Figure 1:
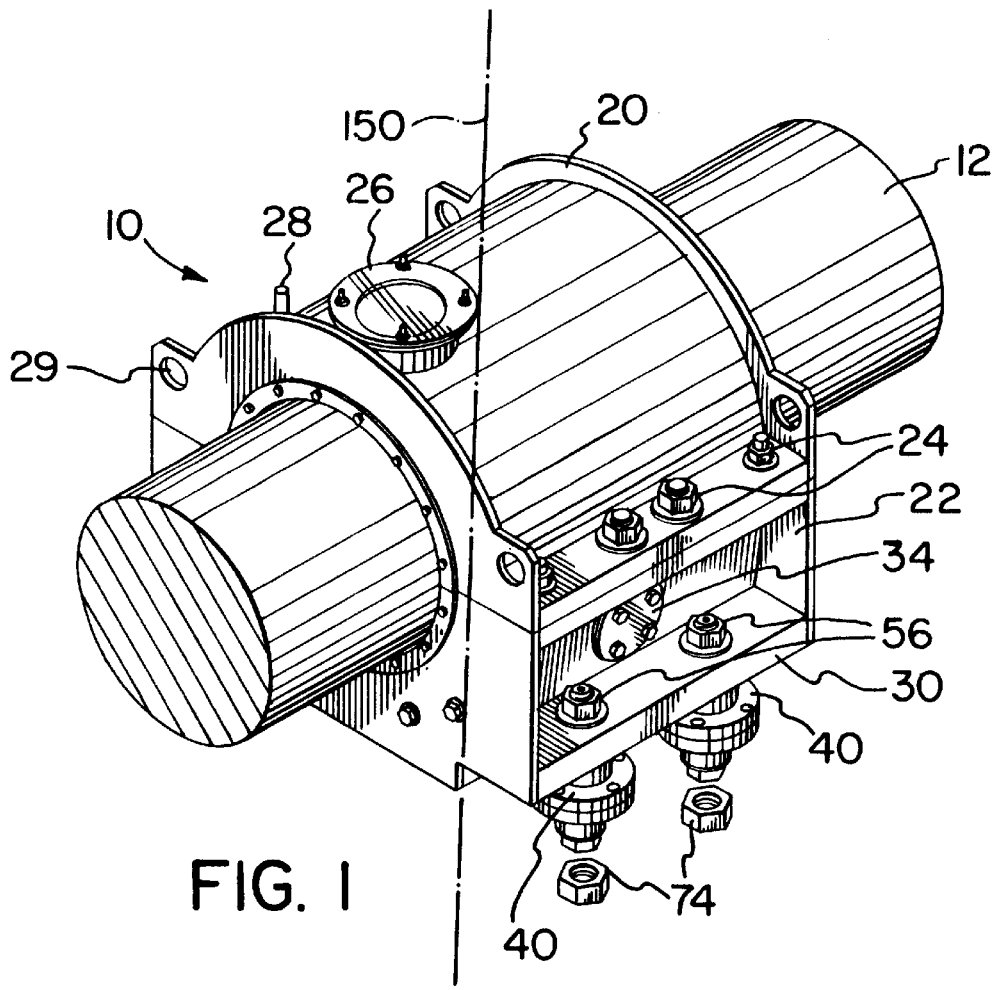
FIG. 1 illustrates a perspective view of an intermediate bearing shown with a portion of an intermediate shaft, including four hydraulic jacking units mounted thereon according to the present invention.

FIGS. 1 and 2A–2C show an intermediate bearing assembly 10 that is used to support the weight of a shaft 12. The shaft 12 is coupled on the forward end to a thrust bearing or gearbox and at the aft end to a tailshaft. The gearbox and tailshaft are known components of marine vessels and are not shown in the drawings. The shaft 12 is made in sections that are coupled together for extremely long spans. For example, an intermediate shaft may span a distance of up to 22 diameters between supports, resulting in a specific pressure with a 1:1 to 1.5:1 Load/Distance (L/D) ratio of approximately 2 Kg/cm sq. In large marine vessels with machinery located amidship, five or six bearings 10 would be required to support the shaft 12 along a straight line.

The intermediate bearing assembly 10 includes an upper housing 20 and a lower housing 22 joined together by a series of bolts 24. The housings 20 and 22 are metal and preferably made of steel or aluminum. The upper housing 20 includes a sight glass port 26 to provide a means for visually monitoring the operating state of the bearing 10 and a lubricant fill pipe 28 for receiving a supply of bearing lubricating material. A series of padeyes 29 are incorporated into the corners of the upper housing 20 to accommodate hooks from a lifting device (not shown) for installation and removal of the upper housing 20 of the bearing 10.

The lower housing 22 includes a pair of mounting flanges 30, one flange 30 being located on each side of the lower housing 22. Each mounting flange 30 includes two receiving apertures 32 (best seen in FIG. 2B). A service entry port 34 in the lower housing 22 is used to gain access to the lower portion of the bearing assembly 10 for conventional water cooling systems (not shown).

Internal contact surfaces 36 (best shown in FIGS. 2B and 2C) of the housings 20 and 22 are composite bearing shells with a bronze metallic component fitted with a relatively thin lining of self-lubricating polymer as a bearing facing. The bearing 10 is capable of operation in oil, water and Thor-Lube™, which is a biodegradable polymer lubricant. The advantage of a biodegradable lubricant is that the fluid can pass a bilge separator avoiding contamination and filling of a sludge tank. In addition, bio-degradable lubricant can be used in unlubricated slow moving applications. Various mechanisms well known in the art can be used to collect oil from a sump and deliver it to the contact surfaces 36 of the housings 20 and 22 to provide adequate levels of lubrication to the bearing assembly 10.

Since the polymer bearing material is essentially self-lubricating, it does not rely on the early formation of a hydrodynamic film of lubricant to separate the shaft 12 from the internal contact surfaces 36.

Figure 3:
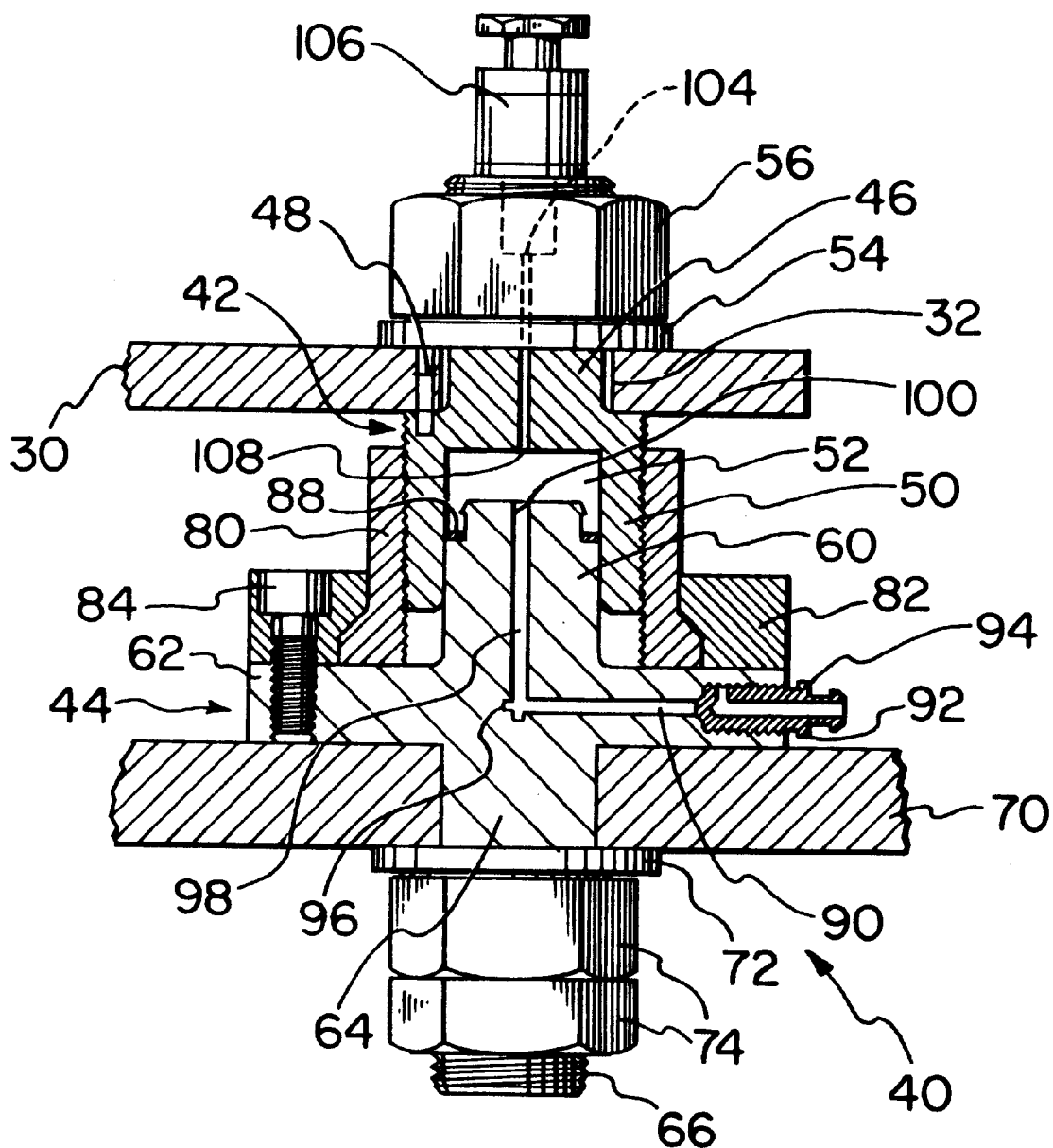
FIG. 3 illustrates a schematic sectional view of one of the hydraulic jacks shown in FIG. 1.

FIG. 3 illustrates a schematic section of a hydraulic jack 40. The jack 40 includes a cylinder portion 42 and a piston portion 44. The cylinder portion 42 consists of an upper section 46 and a lower threaded section 50 having a piston receiving region 52. The upper section 46 cooperatively fits into one of the receiving apertures 32 in one of the mounting flanges 30 of the lower housing 22. A dowel pin 48 secures the mounting flange 30 of the lower housing 22 to the lower section 50 of the cylinder portion 42. The upper section 46 receives a washer 54 and nut 56 combination to securely attach the cylinder portion 42 to the lower housing 22 of the bearing assembly 10.

The piston portion 44 consists of an upper section 60, a base section 62 and a lower section 64 having a threaded portion 66. The lower section 64 passes through a receiving aperture 68 in a pedestal 70, which is a support structure that is attached to the hull of the marine vessel. The piston portion 44 is secured to the pedestal 70 by a washer 72 and two nuts 74.

A locking collar 80 is screwed down on the lower threaded section 50 of the cylinder 42 until metal to metal contact is achieved with the base section 62 of the piston 44. A clamp ring 82 is attached over the locking collar 80 and secured to the base 62 using a retention bolt 84 to securely lock the collar 80. Locked in the manner shown in FIG. 3, the jack 40 is capable of resisting both compressive and tension loads to maintain the shaft 12 in an aligned position.

A gasket 88 (for example, a synthetic polymer Thorflex™ brand seal) is located around the upper section 60 of the piston 44 to inhibit leakage of hydraulic fluid from the region 52.

A hydraulic line 90 extends horizontally from a bleed end 92 capped by a bleeder screw 94 to an intermediate region 96 in the base section 62 of the piston 44. A hydraulic line 98 extends vertically from the intermediate region 96 in the base section 62 to a piston line aperture 100 in the upper section 60 for bleeding hydraulic fluid from the chamber 52 for raising and lowering operations. A hydraulic line 102 extends vertically from a fill end 104 capped by a fill connector valve assembly 106 to a cylinder line aperture 108 in the cylinder 42.

The cylinder 42 filling and bleeding sequence is well known in the art and is similar to that followed for bleeding of vehicular hydraulic brake systems.

Figure 2A:
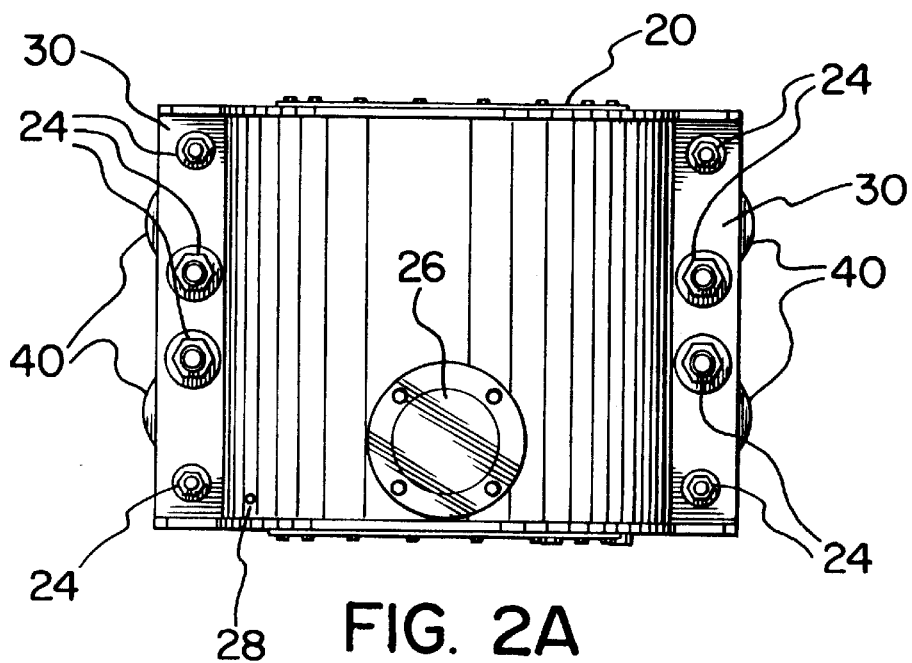
FIG. 2A illustrates a top view of the intermediate bearing shown in FIG. 1.
Figure 2B:
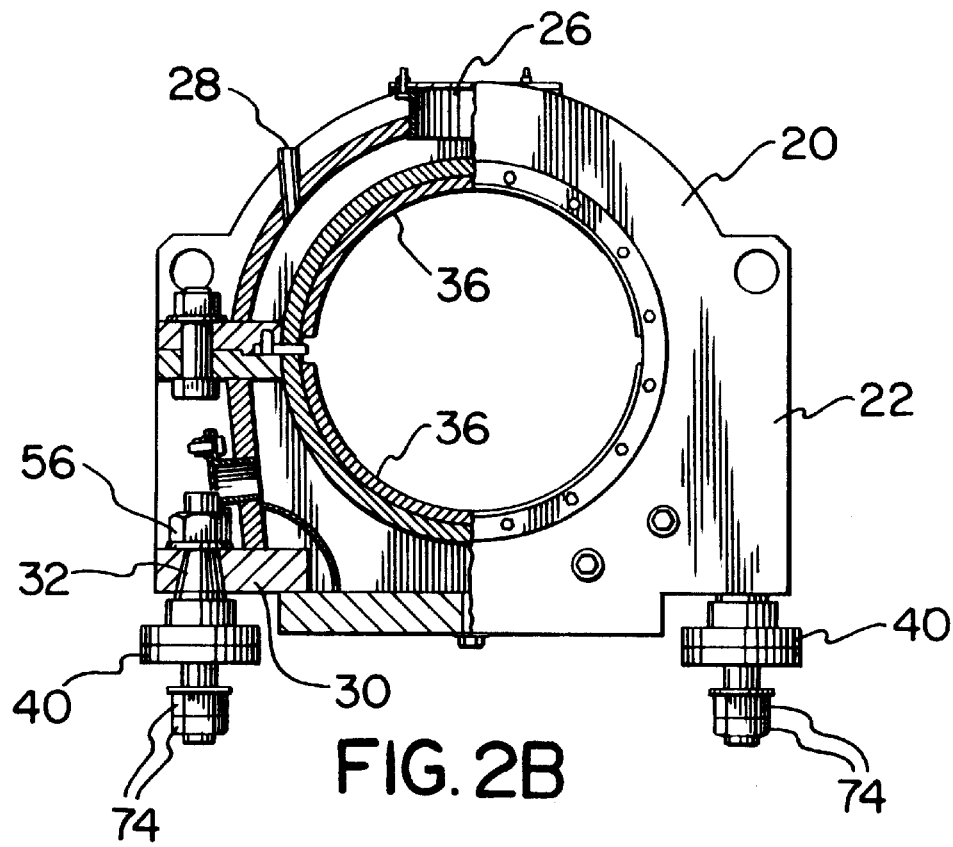
FIG. 2B illustrates a front view of the intermediate bearing shown in FIG. 1.
Figure 2C:
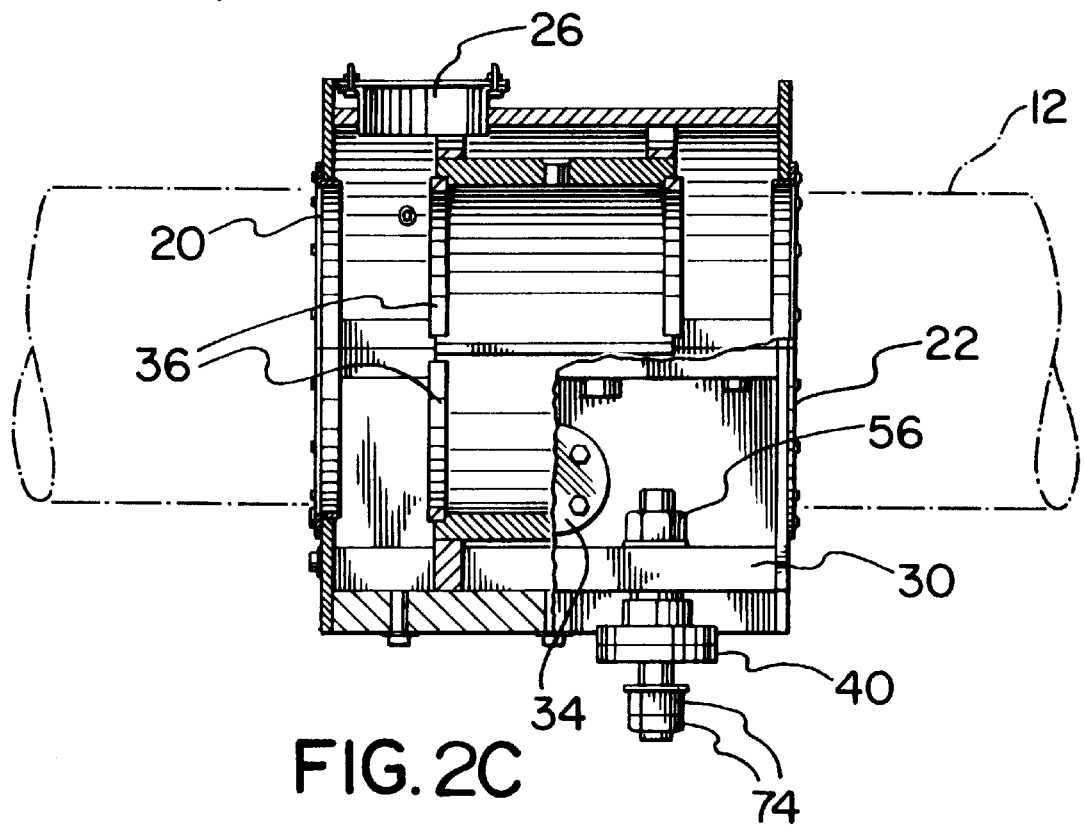
FIG. 2C illustrates a side view of the intermediate bearing shown in FIG. 1 shown with a portion of an intermediate shaft.
Figure 4:
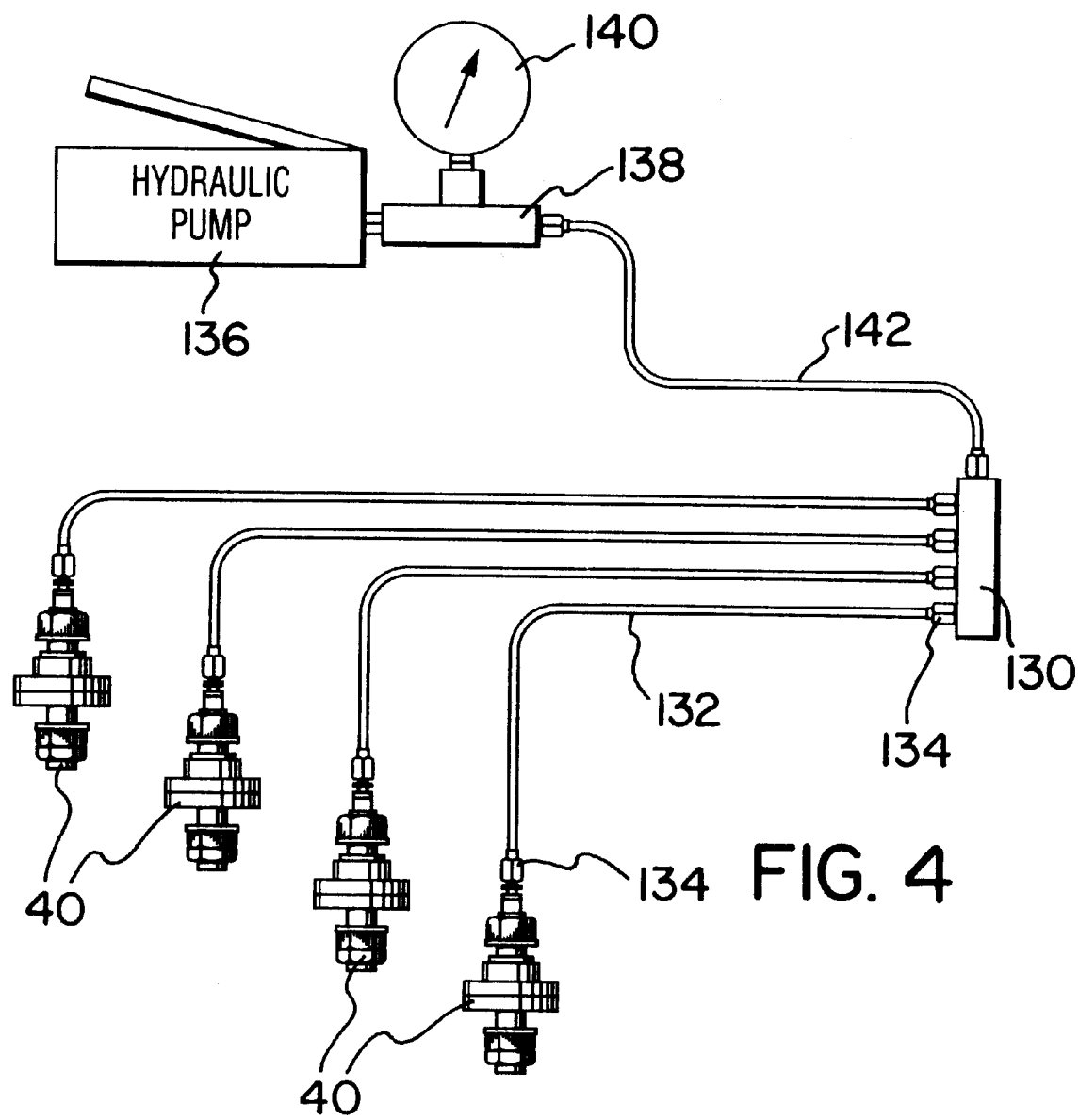
FIG. 4 illustrates a schematic view of a manifold assembly used to connect the hydraulic jacks together.

As shown in FIG. 2A, the bearing assembly 10 is mounted to four hydraulic jacks 40. Referring to FIG. 4, the jacks 40 are connected to a manifold 130 by a plurality of hoses 132 so that a single point of connection is made for the purpose of operating them in unison. Each hose 132 includes a coupling 134 that attaches to the connector valve 106 of the jack 40 at one end and at the other end to the manifold 130. A hydraulic pump 136 is connected through a tee connector 138 having a gauge 140 to the manifold 130 by a pump hose 142.

Bearing alignment and loading are achieved together as the pump 136 provides hydraulic pressure through the manifold 130 to the jacks 40 until the desired pressure is achieved.

Hydraulic pressure is related through the area of the cylinders 42 of the jacks 40 to radial force. As a result, when the predetermined jacking force is achieved, the correct radial force loading on the bearing 10 is attained. Each bearing 10 is provided with a relationship to link bearing force to hydraulic system pressure. Each of the jacks 40 is free to seek a position of extension independent of the others. Consequently, misalignment between the pedestal 70 and the shaft 12 can be accommodated, as each jack 40 will bring to bear the same force on each of the bearings 10 four corners, ensuring full and uniform contact between the lower housing 22 and the shaft 12.

The phenomenon of hysteresis between loading and unloading requires the plotting of load vs. shaft position curves and choosing a mean value. These methods are well known in the art. However, since the four jacks 40 are located equidistant from the bearing center (the bearing center is defined as a center vertical axis 150 of the bearing assembly 10) to provide a symmetrical distribution inaccuracies in these methods are reduced.

Since the jacking operation is simple and quick, the operation is possible at any time during the construction of the vessel. Ideally, it would be one of the last operations to be performed after the vessel has been launched, loaded appropriately and all gear fitted. However, re-jacking to correct misalignment can easily be accommodated.

In particular, if at any time during the life of the vessel, shaft alignment is disturbed, repositioning of the bearings 10 can be accomplished by removing the retention bolt 84 and clamp ring 82 unscrewing the locking collar 80 of each of the jacks 40, re-connection the jacks 40 to the manifold 130 and re-jacking as previously described.

I claim:

1. A bearing assembly having a center vertical axis and being mountable on a pedestal of a marine vessel, said bearing assembly comprising:
    a housing for receiving a portion of a shaft; and
    a series of jacks attached between the housing and the pedestal and being located equidistant from the center vertical axis of the housing, each said lack including;
    a cylinder portion attached to the bearing assembly;
    a piston portion slidably engagable within the cylinder portion, said piston portion being attached to the pedestal;
    control means for raising and lowering the cylinder portion to position the shaft at a desired level; and
    locking means for rigidly securing the cylinder portion and piston portion together to maintain the shaft at the desired level.

2. The assembly of claim 1, wherein the cylinder portion includes an upper section and a lower threaded section having a piston receiving region; and wherein the piston portion includes an upper section engagable within the piston receiving region, a base section, and a lower section having a threaded portion.

3. The assembly of claim 2, wherein the cylinder portion includes an entry passage having a fill port and an exit port with said exit port being in fluid communication with the piston receiving region for directing a fluid into the piston receiving region.

4. The assembly of claim 3, further including a fill connector valve assembly for capping the fill port of the entry passage.

5. The assembly of claim 3, wherein the piston portion includes a bleed passage having a entry port and an exit port with said entry port being in fluid communication with the piston receiving region for bleeding fluid from the piston receiving region.

6. The assembly of claim 5, further including a bleeder screw for capping the exit port of the bleed passage.

7. The assembly of claim 6, wherein the control means is a pump means for forcing a hydraulic fluid through the entry passage into the piston receiving region to raise and to lower the cylinder portion relative to the piston portion.

8. The assembly of claim 7, wherein the pump means includes a hydraulic pump connected to a manifold with each of the jacks being connected to the manifold.

9. The assembly of claim 3, which comprises a series of four jacks.

10. The assembly of claim 2, wherein the locking means includes a threaded collar engagable about the lower threaded section of the cylinder portion for securing the cylinder portion to the piston portion; and further including a clamping ring to secure the locking collar to the base section of the piston portion and a retention bolt threaded through the clamping ring and the base section of the piston portion.

11. A bearing assembly comprising a housing for receiving a portion of a shaft and being mountable on a pedestal and at least one lack attached between the housing and the pedestal, said jack comprising;
    a cylinder portion attached to the housing of the bearing assembly;
    a piston portion slidably engagable within the cylinder portion, said piston portion being attached to the pedestal;
    control means for raising and lowering the cylinder portion to position the shaft at a desired level; and
    means for rigidly securing the cylinder portion and piston portion together to maintain the shaft at the desired level.

12. The assembly of claim 11, wherein the cylinder portion includes an upper section and a lower threaded section having a piston receiving region.

13. The assembly of claim 12, wherein the piston portion includes an upper section engagable within the piston receiving region, a base section, and a lower section having a threaded portion.

14. The assembly of claim 13, wherein the cylinder portion includes an entry passage having a fill port and an exit port with said exit port being in fluid communication with the piston receiving region for directing a fluid into the piston receiving region.

15. The assembly of claim 14, further including a fill connector valve assembly for capping the fill port of the entry passage.

16. The assembly of claim 13, wherein the piston portion includes a bleed passage having a entry port and an exit port with said entry port being in fluid communication with the piston receiving region for bleeding fluid from the piston receiving region.

17. The assembly of claim 16, further including a bleeder screw for capping the exit port of the bleed passage.

18. The assembly of claim 17, wherein the control means is a pump means for forcing a hydraulic fluid through the entry passage into the piston receiving region to raise the cylinder portion relative to the piston portion.

19. The assembly of claim 13, wherein the locking means includes a threaded collar engagable about the lower threaded section of the cylinder portion for securing the cylinder portion to the piston portion.

20. The assembly of claim 19, further including a clamping ring to secure the locking collar to the base section of the piston portion.

21. The assembly of claim 20, further including a retention bolt treaded through the clamping ring and the base section of the piston portion.

22. The assembly of claim 21, further including a gasket positioned around the top of the upper section of the piston portion.

\* \* \* \* \*